United States Patent
Sivakumar et al.

(10) Patent No.: US 11,765,589 B2
(45) Date of Patent: Sep. 19, 2023

(54) AGGREGATION AND CORRELATION OF ROGUE BROADCAST SERVICE SET IDENTIFIERS TO A PHYSICAL ACCESS POINT

(71) Applicant: Cisco Technology, Inc., San Jose, CA (US)

(72) Inventors: Hari Sivakumar, Karnataka (IN); Ayyanna Gurikar, Bangalore (IN); Ashwin Talanki Narasimha Murthy, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 669 days.

(21) Appl. No.: 16/696,449

(22) Filed: Nov. 26, 2019

(65) Prior Publication Data

US 2021/0160695 A1 May 27, 2021

(51) Int. Cl.
*H04W 12/122* (2021.01)
*H04W 48/14* (2009.01)
*H04W 76/11* (2018.01)
*H04W 80/02* (2009.01)

(52) U.S. Cl.
CPC ......... *H04W 12/122* (2021.01); *H04W 48/14* (2013.01); *H04W 76/11* (2018.02); *H04W 80/02* (2013.01)

(58) Field of Classification Search
CPC ... H04W 12/122; H04W 76/11; H04W 48/14; H04W 80/02
See application file for complete search history.

(56) References Cited

U.S. PATENT DOCUMENTS

| | | | |
|---|---|---|---|
| 7,263,076 B1* | 8/2007 | Leibovitz | H04L 63/101 455/426.2 |
| 7,286,515 B2 | 10/2007 | Olson et al. | |
| 10,334,445 B2 | 6/2019 | Hooda et al. | |
| 2010/0020746 A1* | 1/2010 | Zaks | H04L 63/20 370/328 |
| 2013/0067041 A1* | 3/2013 | Low | H04W 8/245 709/220 |
| 2014/0105395 A1* | 4/2014 | Hart | H04W 4/029 380/259 |
| 2016/0202342 A1* | 7/2016 | Collins | H04W 24/10 455/456.2 |
| 2017/0070361 A1* | 3/2017 | Sundermeyer | H04L 67/025 |
| 2017/0273012 A1* | 9/2017 | Zhang | H04W 48/06 |

(Continued)

OTHER PUBLICATIONS

Cisco, "Rogue Management in an Unified Wireless Network", Document ID: 112045, Aug. 21, 2019, https://www.cisco.com/c/en/us/support/docs/wireless/4400-series-wireless-lan-controllers/112045-handling-rogue-cuwn-00.html, 41 pages.

(Continued)

*Primary Examiner* — Azizul Choudhury
(74) *Attorney, Agent, or Firm* — Edell, Shapiro & Finnan, LLC

(57) ABSTRACT

A device receives data indicative of a plurality of broadcast service set identifiers. The device applies a schema to the data indicative of the plurality of broadcast service set identifiers to determine data indicative of a physical access point that broadcasts each of the plurality of broadcast service set identifiers. The device provides the data indicative of the physical access point to a user interface.

18 Claims, 9 Drawing Sheets

(56) References Cited

U.S. PATENT DOCUMENTS

2018/0176784 A1* 6/2018 Carter .................. G06Q 30/04
2019/0053137 A1* 2/2019 Watanabe ........... H04W 40/244
2019/0214060 A1* 7/2019 Goel .................... H04W 12/02
2020/0162924 A1 5/2020 Desai et al.

OTHER PUBLICATIONS

Ruckus Networks, "Article No. 000004312", https://support.ruckuswireless.com/articles/000004312, Jul. 17, 2017, 3 pages.
Aruba Networks, "show_wms", https://www.arubanetworks.com/techdocs/ArubaOS_61/ArubaOS_61_CLI/show_wms.htm, downloaded Nov. 26, 2019, 23 pages.
Aruba Networks, "Detecting Rogue APs", https://www.arubanetworks.com/techdocs/ArubaOS_64_Web_Help/Content/ArubaFrameStyles/New_WIP/Rogue_AP_Detection.htm, downloaded Nov. 26, 2019, 3 pages.
Aruba Networks, "Rogue AP Detection and Classification", https://www.arubanetworks.com/techdocs/InstantWenger_Mobile/Advanced/Content/Instant%20User%20Guide%20-%20volumes/Rogue_AP_Detection_and_C.htm, downloaded Nov. 26, 2019, 4 pages.
Ruckus Networks, "Article No. 000001261", https://support.ruckuswireless.com/articles/000001261, Jan. 21, 2019, 4 pages.
Thad, "Finding Rogue AP MAC Addresses", https://thwack.solarwinds.com/thread/108222, Dec. 2, 2016, 5 pages.
Cisco, "Rogue AP Detection", https://www.cisco.com/assets/sol/sb/AP541N_Emulators/AP541N_Emulator_v1.9.2/help_Rogue_AP_Detection.htm, downloaded Nov. 26, 2019, 2 pages.
WatchGuard Technologies, Inc., "Rogue Access Point Detection", https://www.watchguard.com/help/docs/fireware/12/en-US/Content/en-US/wireless/wireless_rogue_ap_detection_c.html, downloaded Nov. 26, 2019, 2 pages.
SolarWinds Worldwide, LLC., "Rogue Access Point Detection with Network Performance Monitor and User Device Tracker", https://www.solarwinds.com/topics/rogue-access-point-detection, downloaded Nov. 26, 2019, 5 pages.
Howartp, "Ruckus Wireless MAC Addresses", http://www.edugeek.net/forums/wireless-networks/149680-ruckus-wireless-mac-addresses.html, Apr. 2008, 5 pages.

* cited by examiner

| DESIGN | POLICY | PROVISION | ASSURANCE | PLATFORM | | | | ☐ ☐ ☒ |
|---|---|---|---|---|---|---|---|---|
| Threats (23045) | | | | | | | | Last Updated: 10:08 am |

| Threat Level | MAC Address | Type | Connection | Detecting AP | Detecting AP Site | RSSI | SSID | Last Reported |
|---|---|---|---|---|---|---|---|---|
| Potential | 00:00:3A:73:0E:01 | Interferer | Wireless | TsimAP53-60 | Global | 58 | TSIM_ROGUE_AP_SSID3585 | Apr 10, 2019 09:22 am |
| Potential | 00:00:3A:73:0C:CA | Interferer | Wireless | TsimAP53-55 | Global | 52 | TSIM_ROGUE_AP_SSID3274 | Apr 10, 2019 09:26 am |
| Potential | 00:00:3A:73:09:CC | Interferer | Wireless | TsimAP53-42 | Global | 45 | TSIM_ROGUE_AP_SSID2508 | Apr 10, 2019 09:26 am |
| Potential | 00:00:3A:73:19:00 | Interferer | Wireless | TsimAP53-111 | Global | 55 | TSIM_ROGUE_AP_SSID6608 | Apr 10, 2019 09:26 am |
| Potential | 00:00:3A:73:05:56 | Interferer | Wireless | TsimAP53-24 | Global | 59 | TSIM_ROGUE_AP_SSID1382 | Apr 10, 2019 09:26 am |
| Potential | 00:00:3A:73:1E:9C | Interferer | Wireless | TsimAP53-131 | Global | 42 | TSIM_ROGUE_AP_SSID7836 | Apr 10, 2019 09:26 am |
| Potential | 00:00:3A:73:0A:F8 | Interferer | Wireless | TsimAP53- | Global | 46 | TSIM_ROGUE_AP_SSID2808 | Apr 10, 2019 09:26 am |

Show 100 entries

Showing 1-100 of 23,045

[1|2|3|4|5|...|231|Next]

FIG. 2A

| DESIGN | POLICY | PROVISION | ASSURANCE | PLATFORM | | | | Last Updated: 10:56 am |
|---|---|---|---|---|---|---|---|---|

Threats (1438) — 210b

| Threat Level | MAC Address | Type | Connection | Detecting AP | Detecting AP Site | RSSI | SSID | Last Reported |
|---|---|---|---|---|---|---|---|---|
| High | 00:FE:C8:73:02:B0 | Honeypot | Wireless | TsimAP53-12 | Global | 42 | TSIM_ROGUE_AP_SSID696 | Apr 10, 2019 10:47 am |
| Potential | 00:FE:C8:73:3B:10 | Interferer | Wireless | TsimAP53-252 | Global | 43 | TSIM_ROGUE_AP_SSID15130 | Apr 10, 2019 10:50 am |
| Potential | 00:FE:C8:73:3D:70 | Interferer | Wireless | TsimAP53-263 | Global | 41 | TSIM_ROGUE_AP_SSID15743 | Apr 10, 2019 10:55 am |
| Potential | 00:FE:C8:73:62:A0 | Interferer | Wireless | TsimAP53-421 | Global | 41 | TSIM_ROGUE_AP_SSID25259 | Apr 10, 2019 10:55 am |
| Potential | 00:FE:C8:73:10:E0 | Interferer | Wireless | TsimAP53-73 | Global | 48 | TSIM_ROGUE_AP_SSID4335 | Apr 10, 2019 10:55 am |
| Potential | 00:FE:C8:73:06:70 | Interferer | Wireless | TsimAP53-28 | Global | 43 | TSIM_ROGUE_AP_SSID1648 | Apr 10, 2019 10:55 am |
| Potential | 00:FE:C8:73:0A:60 | Interferer | Wireless | TsimAP53-45 | Global | 42 | TSIM_ROGUE_AP_SSID2260 | Apr 10, 2019 10:55 am |

Show 100 entries — 220b

Showing 1-100 of 1,483

| 1 | 2 | 3 | 4 | 5 | ... | 15 | Next | — 215b

FIG. 2B

DESIGN    POLICY    PROVISION    ASSURANCE    PLATFORM

Threats (1)

SSID is Contains Mobi

| Threat Level | Rogue AP MAC Address | Type |
|---|---|---|
| Potential | C0:8A:DE:27:9C:80 | Interferer |

510

Threat 360: Mac C0:8A:DE:27:9C:80

Detecting Access Points (4)   Clients (1)

Detecting Access Points (4)

Export — 520

| Detecting AP | AP Domain | Rogue SSID | RSSI | Channels | Radio Type | SNR | State | Last Reported |
|---|---|---|---|---|---|---|---|---|
| AP0062.EC4A.593A | ...bangalore/bgl18/4th floor | Test-Radius | -63 | 6 | 802.11n (2.4) | 32 | Active | May 08, 2019 12:27 am |
| AP006B.F116.1C60 | ...bangalore/bgl18/4th floor | inMobi-Guest | -70 | 1 | 802.11n (2.4) | 7 | Active | May 16, 2019 10:51 am |
| AP006B.F116.1C60 | ...bangalore/bgl18/4th floor | inMobi-BYOD | -72 | 1 | 802.11n (2.4) | 5 | Active | May 16, 2019 10:52 am |
| AP0062.EC4A.593A | ...bangalore/bgl18/4th floor | inMobi-BYOD | -73 | 1 | 802.11n (2.4) | -2 | Active | May 16, 2019 10:52 am |

Showing 4 of 4

FIG.5

AGGREGATION AND CORRELATION OF ROGUE BROADCAST SERVICE SET IDENTIFIERS TO A PHYSICAL ACCESS POINT

TECHNICAL FIELD

The present disclosure relates to the detection and reporting of rogue broadcast service set identifiers in network environments.

BACKGROUND

A rogue access point, such as a wireless access point, is an access point installed on a secure network without explicit authorization from a local network administrator, whether added by a well-meaning user or by a malicious attacker. Each access point may broadcast a plurality of broadcast service set identifiers (BSSIDs). Depending on the network environment, the number of individual BSSIDs associated with rogue APs may be large. A large number of rogue events may come from each wireless local area network controller (WLC). This large number of rogue events may make rogue AP analysis unwieldy. The difficulty of performing rogue AP analysis may increase with the adoption of larger bandwidth technologies, such as a fifth generation (5G) mobile network and a Wi-Fi 6 wireless network.

BRIEF DESCRIPTION OF THE DRAWINGS

FIGS. 2A and 2B are illustrations of a second user interface that highlights benefits of the aggregation and correlation techniques of the present disclosure, according to an example embodiment.

FIG. 5 is an illustration of a third user interface that implements the aggregation and correlation techniques of the present disclosure, according to an example embodiment.

DESCRIPTION OF EXAMPLE EMBODIMENTS

Overview

In one embodiment, a device receives data indicative of a plurality of broadcast service set identifiers. The device applies a schema to the data indicative of the plurality of broadcast service set identifiers to determine data indicative of a physical access point that broadcasts each of the plurality of broadcast service set identifiers. The device provides the data indicative of the physical access point to a user interface.

Example Embodiments

An issue with rogue access point (AP) analysis is the number of rogue events coming from each wireless local area network controller (WLC). Due to adoption of new digital technologies and standards, e.g., fifth generation (5G) mobile networks and Wi-Fi 6 wireless networks, the number of devices added to network environments is expected to increase with an accompanying increase in the threat surface. In turn, the number rogue APs and rogue events detected is also expected to increase. Analyzing and consolidating rogue devices, rogue APs and rogue events may become a challenge. The user of rogue AP analysis software may experience challenges, such as:

1) A large number of rogue events may be displayed in an unwieldy interface.
2) A user attempting to correlate or group rogue broadcast service set identifiers (BSSIDs) from the same physical AP may not be able to do so given the large number of displayed events.

Figure 1:
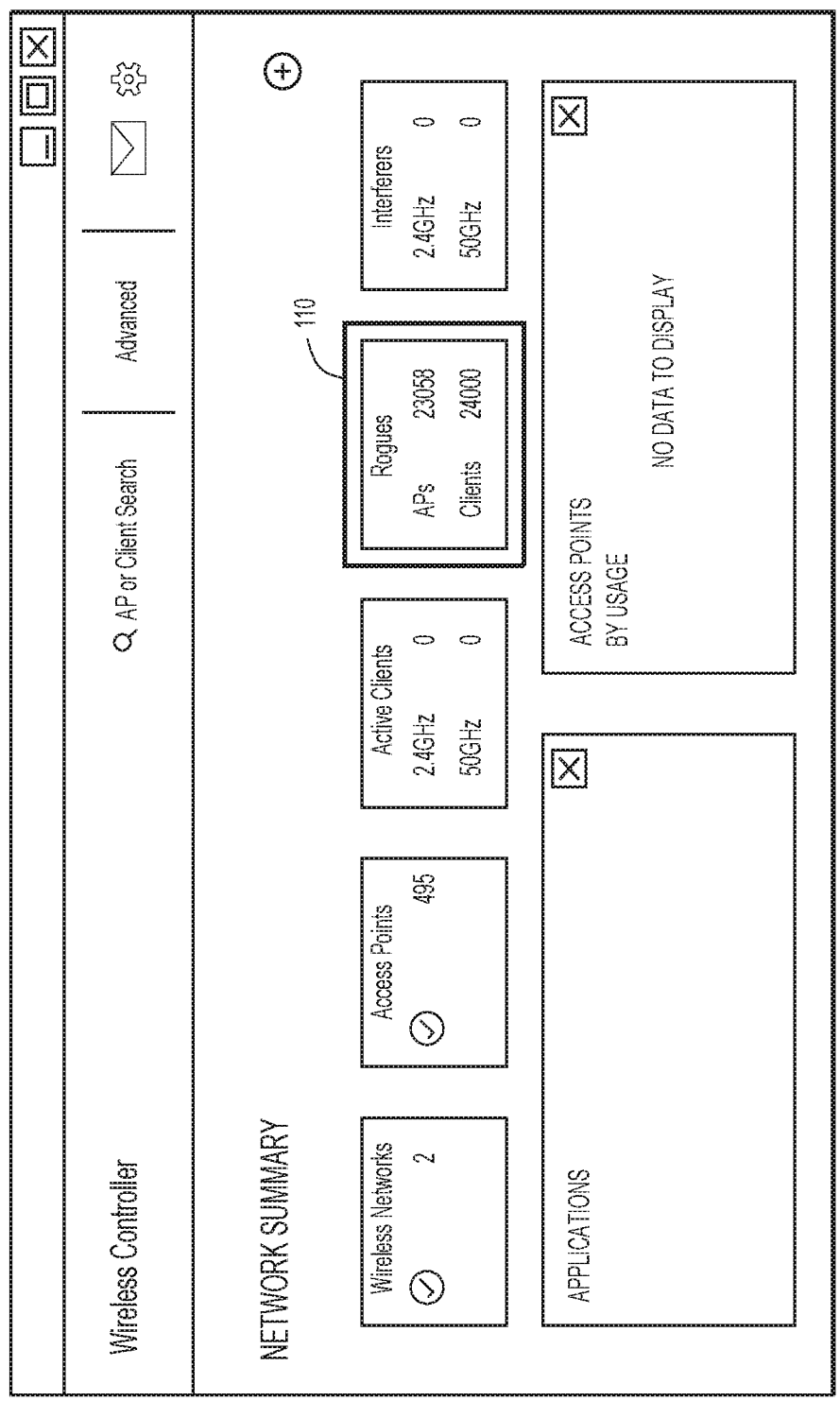
FIG. 1 is an illustration of a first user interface that implements the aggregation and correlation of rogue broadcast service set identifiers to a physical access point techniques of the present disclosure, according to an example embodiment.

FIG. 1 illustrates a WLC user interface 100 displaying rogue APs and rogue clients without the use of the techniques of the present disclosure. Specifically, section 110 indicates approximately 24,000 rogue APs, and 24,000 rogue clients. Displaying such a large number of threats to a user results in a very unwieldy rogue AP analysis interface, as illustrated in FIG. 2A.

FIG. 2A illustrates a user interface 200*a* of a system that provides for rogue AP analysis, such as Cisco's Digital Network Architecture (DNA) Center (DNAC) management platform. User interface 200*a* displays the 24,000 rogue APs to the user (as indicated in section 210*a*) on over 231 pages of threats (as indicated in section 215*a*). Accordingly, each page of user interface 200*a* contains approximately 100 events to be scrolled through by a user. In order to adequately analyze these threats, a user may need to individually consider each event and manually correlate or determine relationships between the events. The large number of rogue APs and clients displayed in FIGS. 1 and 2A are from a single WLC. Management software like that illustrated in FIGS. 1 and 2A may be configured to manage a large number of WLCs, compounding the problem of analyzing and correlating such a large number of rogue threats. The techniques of the present disclosure, when implemented, may alleviate such problems with rogue AP analysis.

Figure 3:
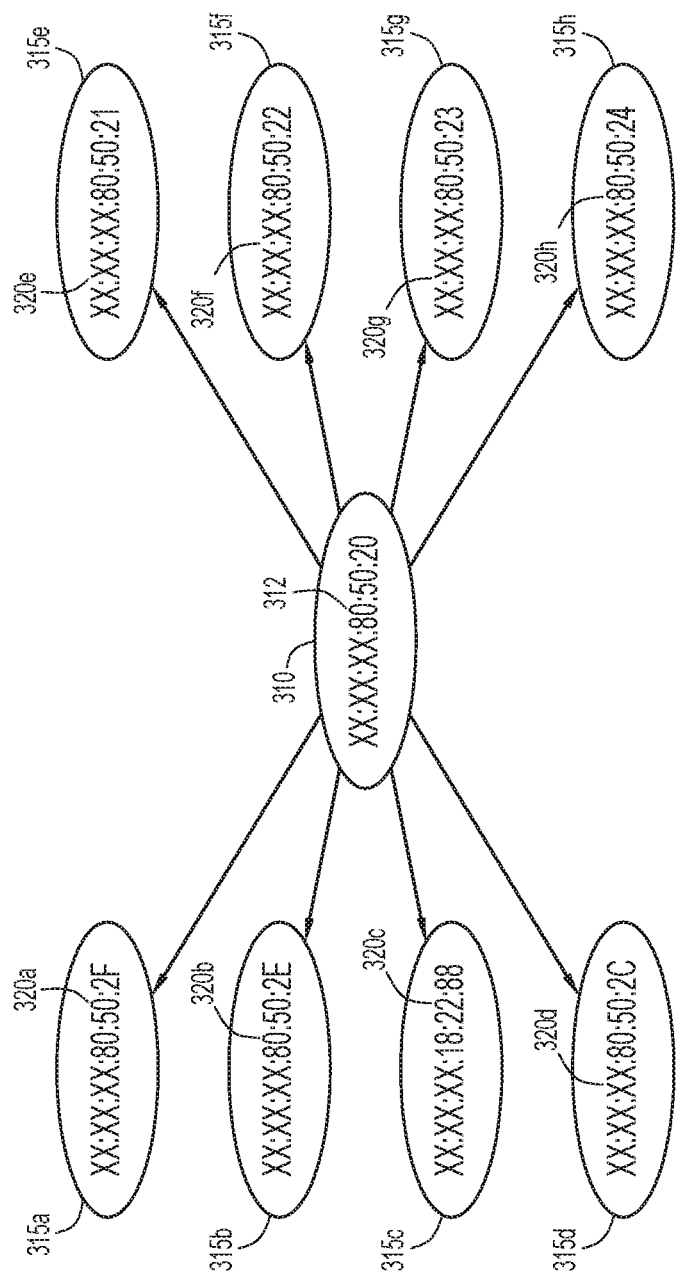
FIG. 3 is a first visual representation of the aggregation and correlation techniques of the present disclosure, according to an example embodiment.

The rogue APs and clients displayed in user interfaces 100 and 200*a* of FIGS. 1 and 2A, respectively, may be based upon the number of BSSIDs reported as rogue by a WLC. The number of actual physical rogue APs that are broadcasting all of the different BSSIDs may be significantly smaller. For example, a single physical AP may broadcast a plurality of BSSIDs. This concept is visually illustrated in FIG. 3. As shown in FIG. 3, the physical AP 310 is associated with an identifier, in this case, Media Access Control (MAC) address 312. Physical AP 310 broadcasts a number of BSSIDs 320*a-h* that may appear on the network as a number of different APs 315*a-h*. Depending on, for example, the model or vendor associated with physical AP 310, a schema or algorithm is used to generate BSSIDs 320a-h. For example, the physical AP 310 may derive BSSIDs 320a-h from MAC address 312 using a schema or algorithm. If the schema or algorithm used to generate BSSIDs 320a-h from MAC address 312 is known or understood, MAC address 312 may be similarly derived from the values of BSSIDs 320a-h. Even if the BSSIDs 320a-h are not derived directly or indirectly from, for example, MAC address 312 of physical AP 310, a schema or algorithm not based on the MAC address may nevertheless be used to generate BSSIDs 320a-h. If this schema or algorithm is known, a "normalized" BSSID may be derived from BSSIDs 320a-h which would serve as an identifier that is associated with all of BSSIDs 320a-h, essentially serving as an identifier of physical AP 310. Accordingly, as used herein, a "normalized BSSID" is an identifier derived or normalized from BSSIDs that may be used to identify the physical AP associated with the BSSIDs. MAC address 312 of physical AP 310 is an example of such a normalized BSSID, though not all normalized BSSIDs will be the MAC address for the physical AP.

The techniques of the present disclosure correlate rogue events associated with a single physical AP to a common normalized BSSID. This concept is also visually represented in FIG. 3. For example, the techniques of the present disclosure may analyze the known BSSIDs 320a-h to determine the common normalized BSSID, which in the example of FIG. 3, is the MAC address 312 of physical AP 310.

In other words, the techniques of the present disclosure are directed to determining a normalized BSSID for a plurality of BSSIDs. This normalized BSSID may then be used to display rogue events associated with a single physical AP in ways that are more user friendly and provide for more efficient analysis of rogue events, as is described in greater detail below. The techniques of the present disclosure may leverage how known vendor types generate BSSIDs to generate a single normalized BSSID that may be used to display rogue events associated with a single physical AP.

According to example embodiments, the techniques of the present disclosure begin with a normalization process. The normalization process may be based on vendor-specific translation algorithms for translating a BSSID to, for example, the MAC address of the physical AP. In the case of a first vendor, BSSIDs generated by one of the first vendor's APs are shown in Table 1, below.

TABLE 1

| SSID NAME | BSSID 2.4 GHz | BSSID 5 GHz |
| --- | --- | --- |
| WLAN1 | XX:XX:XX:80:50:20 | XX:XX:XX:80:50:2F |
| WLAN2 | XX:XX:XX:80:50:21 | XX:XX:XX:80:50:2E |
| WLAN3 | XX:XX:XX:80:50:22 | XX:XX:XX:80:50:2D |
| WLAN4 | XX:XX:XX:80:50:23 | XX:XX:XX:80:50:2C |

A WLC may report each of these BSSIDs for the 2.4 GHz and 5 GHz bands as individual rogue APs when in reality all of the BSSIDs indicated in Table 1 are broadcast from a single physical AP. These BSSIDs may be normalized to show a single MAC address corresponding to the physical AP associated with all of the BSSIDs. For the physical AP that generates the BSSIDs in Table 1, the schema or algorithm used takes the MAC address associated with the physical AP and alters the final digit of the MAC address. Applying the techniques of the present disclosure to the BSSIDs illustrated in Table 1, it may be determined that the normalized BSSID for these rogue events (which in this example is the MAC address of the physical AP) is: XX:XX:XX:80:50:20.

More specifically, according to the present example, the BSSIDs in Table 1 would be analyzed to first determine the vendor associated with the BSSIDs. As known to the skilled artisan, a MAC address is structured such that it includes six octets, i.e., six two-digit hexadecimal values. The first three octets (which are all indicated as "XX" in the example MAC address above) may be used to identify the vendor or manufacturer associated with the device to whom the MAC address has been assigned. These first three octets may be characterized as an organizationally unique identifier. For vendors who derive BSSIDs from the MAC address of the physical AP that broadcasts the BSSID, the first three octets of the BSSID may be used to determined which rogue BSSIDs are associated with physical APs provided by, or manufactured by, the same entity.

The next three octets may be used to determine which of that manufacturer's or vendor's physical access points is broadcasting the BSSID. For example, the first vendor's APs generally have a "0" as the second digit in the sixth octet of it MAC address. These first vendor APs may alter the last digit of the sixth octet of the MAC address to generate BSSIDs for the physical AP. Accordingly, by analyzing the last three octets of BSSIDs from a known first vendor physical AP, the MAC address of the physical AP may be determined.

Applying this technique to the values in Table 1, it would be determined that all of the rogue APs are generated by the first vendor's APs as they all share the same values in their first three octets (i.e., "XX:XX:XX"). Next, it may be determined that all of the rogue BSSIDs are broadcast by the same first vendor physical AP because they share the same value in the last three octets, except for the last digit of the sixth octet (i.e., "80:50:2"). Finally, the MAC address of the physical AP is determined for these rogue APs by replacing the final digit of the rogue BSSIDs with a "0," resulting in the MAC address of "XX:XX:XX:80:50:20."

Put differently, if the schema or algorithm for how BSSIDs are generated for a physical AP is known, the "inverse" of the schema or algorithm may be used to determine a normalized BSSID (e.g., a MAC address) of the physical AP that broadcasts the BSSIDs.

A user interface of a management system may display the normalized BSSID (the MAC address for the AP in this example) in place of the individual BSSIDs, providing a more user-friendly interface. The management system may also store data indicating the relationships between the BSSIDs and the normalized BSSID. This data permits the management system to display the details of the individual BSSIDs in response to a user request to "drill down" to this level of detail, as will be described in greater detail below with reference to FIG. 5.

Illustrated below in Table 2 is another example set of rogue BSSIDs.

TABLE 2

| SSID | BSSID | Operation Performed | Normalized BSSID |
| --- | --- | --- | --- |
| WLAN1 | XX:XX:XX:D8:22:8D | D8 – 40 – 40 – 40 = 18 | XX:XX:XX:18:22:80 |
| WLAN2 | XX:XX:XX:98:22:8C | 98 – 40 – 40 = 18 | XX:XX:XX:18:22:80 |
| WLAN3 | XX:XX:XX:58:22:89 | 58 – 40 = 18 | XX:XX:XX:18:22:80 |
| WLAN4 | XX:XX:XX:18:22:88 | 18 – 0 = 18 | XX:XX:XX:18:22:80 |

From the first three octets of the BSSIDs the vendor or manufacturer of the physical AP broadcasting these BSSIDs may be determined. For the purposes of this example, it is assumed that the first three octets of the BSSIDs all identify a second vendor as the manufacturer of the physical AP that broadcast these BSSIDs. Where the first vendor AP discussed above may alter the final octet of the physical AP MAC address to derive BSSIDs, the second vendor's physical APs generate BSSIDs by altering the fourth octet of its MAC address. The algorithm described below (and illustrated in the "Operation Performed" column of Table 2) may be used to derive a normalized BSSID for the second vendor's physical APs.

In order to normalize the above-listed BSSIDs in Table 2 to the example normalized BSSID, the following process may be followed:

1. First, the WLC will report the rogue BSSID. For the first value in Table 2, the rogue BSSID is: XX:XX:XX:D8:22:8D.
2. Second, the manufacturer or vender associated with the BSSID is determined from the first three octets of this BSSID. In this example, it is assumed that the second vendor is the manufacturer of the physical AP associated with the BSSID.
3. Third, a vendor- or manufacturer-specific schema or algorithm is applied to the BSSID to determine the normalized BSSID for the physical AP associated with the BSSID. For the second vendor's physical APs, the 4th octet of the rogue BSSID is retrieved. For the first value in Table 2, "D8" is the 4th octet.
4. For the second vendor's BSSIDs, the hexadecimal value of 40 is iteratively subtracted from the 4th octet until the lowest possible positive value is obtained. In other words, the algorithm repeatedly subtracts "40" from the fourth octet until the resulting value is itself less than "40." This process is illustrated as follows:
   D8−40=98
   98−40=58
   58−40=18.
   Because is 18 is less than 40, 18 is the lowest possible positive value.
5. The value obtained in step 4 is merged with the other octets (the 1st, 2nd, 3rd, 5th, and 6th octets). According to the present example, "18" becomes the 4th octet: XX:XX:XX:18:22:8D
6. Finally, the last hexadecimal bit of the last octet is replaced with 0. According to the present example, "8D" is the last octet, and "D" is last hexadecimal bit. Therefore, "D" is replaced by "0." The resulting normalized BSSID obtained for the value in the first row of Table 2 is "XX:XX:XX:18:22:80."

Figure 4:
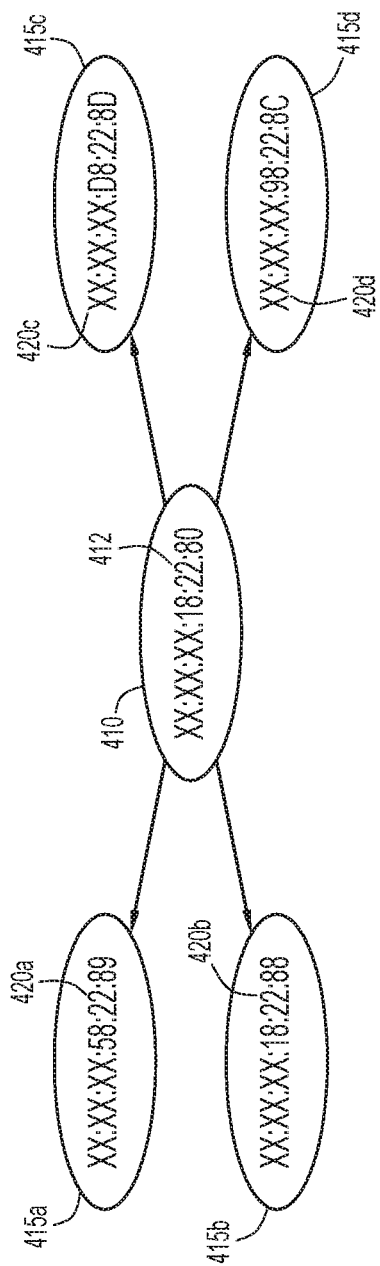
FIG. 4 is a second visual representation of the aggregation and correlation techniques of the present disclosure, according to an example embodiment.

This process may be repeated for each of the BSSIDs in rows 2 through 4 of Table 2. As shown in the "Operation Performed" and "Normalized BSSID" columns, all of the rogue BSSIDs are broadcast from the same physical AP that has the normalized BSSID of "XX:XX:XX:18:22:80." FIG. 4 illustrates a physical AP 410 with the normalized BSSID 412 of "XX:XX:XX:18:22:80" (which according to this example may be the MAC address of AP 410). Physical AP 410 provides rogue APs 415a-d, each of which is associated with a respective BSSID 420a-d that is derived from normalized BSSID 412.

Once the normalized BSSIDs are determined, as illustrated through the example embodiments described above, the normalized BSSIDs may be used to provide a more efficient and/or more user friendly user interface for performing rogue AP analysis. With reference to FIG. 2B, depicted therein is user interface 200b. User interface 200b is similar to user interface 200a of FIG. 2A in that it displays rogue BSSIDs for analysis by a user. Yet, unlike user interface 200a that displays BSSIDs for all detected rogue APs, user interface 200b displays the normalized BSSIDs determined according to processes similar to the example embodiments described above.

Comparing section 210a from FIG. 2A with section 210b from FIG. 2B illustrates that the user is provided with a more manageable number of threats (1,483 versus 23,045) for analysis. As illustrated in sections 215a of FIG. 2A and 215b of FIG. 2B, this more manageable number of threats is displayed across a smaller number of pages (15 versus 231). Further, as illustrated in column 220a of FIG. 2A and column 220b of FIG. 2B, the displayed threats may be sorted by "threat level." In user interface 200a, the threat level is specific to a single BSSID, while the threat level used to sort the threats displayed in user interface 200b is a threat level associated with the normalized BSSID. In other words, the threat level displayed in user interface 200b is the threat level associated with the physical AP. For example, the threat level displayed in user interface 200b may be the highest threat level for all of the individual BSSIDs normalized to the normalized BSSID. According to other examples, the threat level may be determined by a combination or analysis of the individual threat levels of the individual BSSIDs that have been normalized to the normalized BSSID. The threat level displayed in user interface 200b may be the average threat level of the threat levels of the individual BSSIDs that have been normalized to the normalized BSSID. The threat level displayed in user interface 200b may also represent a combined threat level of the individual BSSIDs that have been normalized to the normalized BSSID.

While user interface 200b of FIG. 2B displays rogue APs with normalized BSSID granularity, as opposed to the BSSID granularity of user interface 200a of FIG. 2A, the BSSID data may be preserved and displayed to a user through additional functionality of user interface 200b of FIG. 2B. For example, a user may "drill down" into the data displayed in user interface 200b to view the BSSID data that is aggregated under the normalized BSSID. According to one specific example, if the user double clicks or otherwise selects a specific normalized BSSID, user interface 200b may display the BSSID data that is aggregated under the normalized BSSID. An example embodiment of such a display is illustrated in FIG. 5.

Included in FIG. 5 is user interface display 500 that results from a user double clicking or otherwise selecting a normalized BSSID in user interface 200b of FIG. 2B. Included in user interface display 500 is a normalized BSSID section 510 and a BSSID section 520. Normalized BSSID section 510 displays data analogous to a single entry in user interface 200b of FIG. 2B. Accordingly, normalized BSSID section 510 includes the normalized BSSID and the threat level of the displayed normalized BSSID, as well as additional information known to the skilled artisan that may be helpful to a user performing rogue AP analysis and management. Included in BSSID section 520 is BSSID-specific information for the APs whose BSSIDs were normalized to the normalized BSSID displayed in normalized BSSID section 510. Accordingly, BSSID section 520 displays information analogous to that contained in user interface 200a of FIG. 2A.

Figure 6:
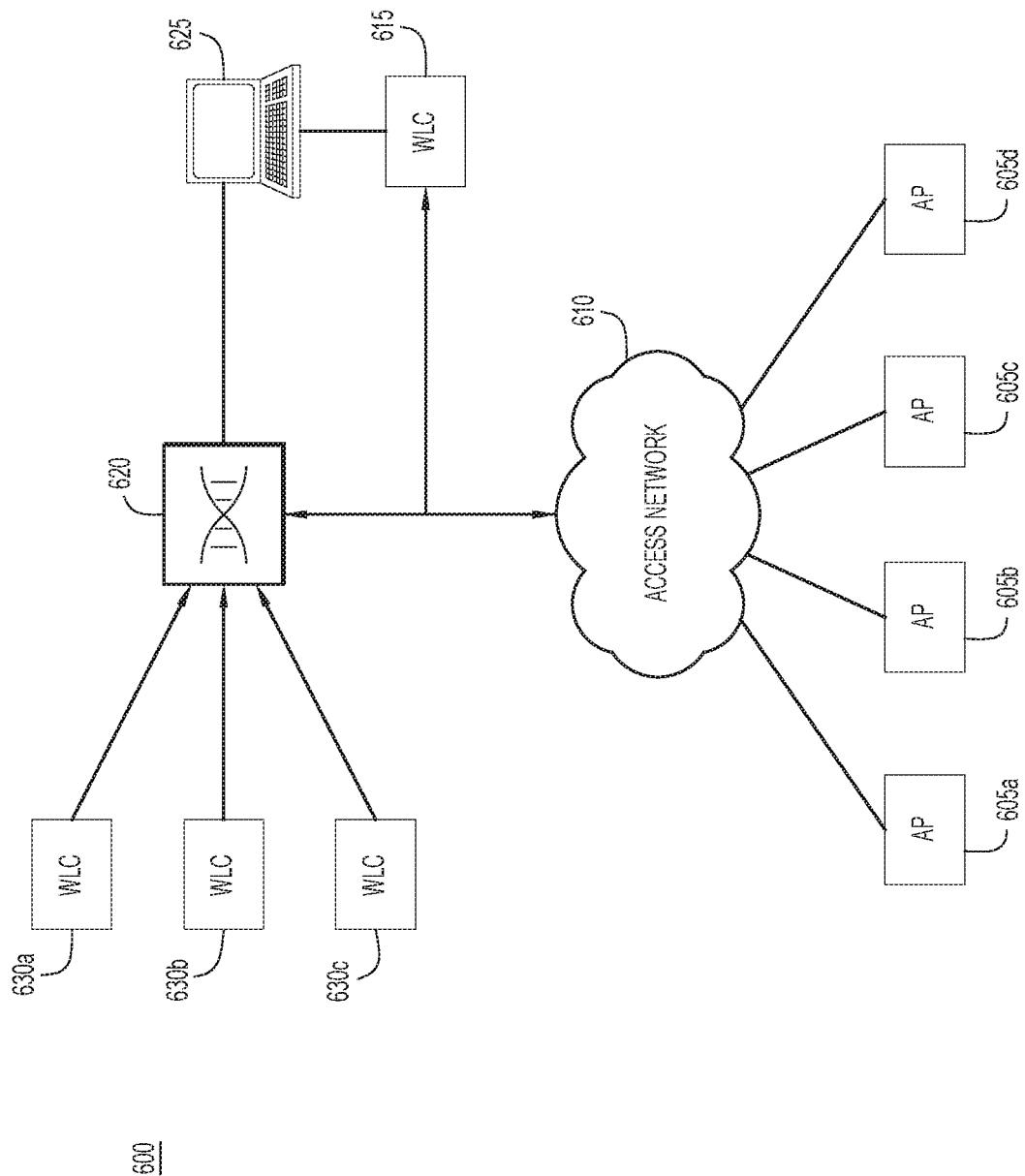
FIG. 6 is a network diagram of a network environment configured to implement the aggregation and correlation techniques of the present disclosure, according to an example embodiment.

With reference now made to FIG. 6, depicted therein is a simplified network environment 600 configured to implement the techniques of the present disclosure. Network environment 600 has been depicted with network devices that implement the techniques of the present disclosure, but the skilled artisan will understand that additional elements may be added to network environment 600, or elements may be removed from network environment 600, without deviating from the inventive concepts of the present disclosure. Network environment 600 includes APs 605a-d, access network 610, WLC 615, management device 620, and user device 625. According to the techniques of the present example embodiment, APs 605a-d will broadcast a plurality of BSSIDs, which are reported by WLC 615.

WLC 615 may normalize the BSSIDs broadcast by APs 605a-d according to the techniques provided herein, and provide data indicative of the normalized BSSIDs and/or the BSSIDs to management device 620. Management device 620 may then provide a user interface like those described above with reference to FIGS. 1, 2A, 2B and/or 5. User device 625 then accesses management device 620 to interact within the user interface. According to other example embodiments, the WLC 615 generates data indicative of the BSSIDs broadcast by APs 605a-d and provides this data to management device 620. Management device 620 may normalize the BSSID data to generate normalized BSSID data according to the techniques described herein. Management device 620 may then provide a user interface like those described above with reference to FIGS. 1, 2A, 2B and/or 5. According to other example embodiments, the functionality of WLC 615, management device 620 and user device 625 may be combined into fewer devices or separated into a greater number of devices. For example, a single device may be configured to perform the operations associated with WLC 615 and management device 620, or a single device may be configured to perform the operations associated with all three of WLC 615, management device 620 and user device 625.

As also illustrated in FIG. 6, a plurality of WLCs may provide BSSID data and/or normalized BSSID data to management device 620. For example, network environment 600 includes WLCs 630a, 630b and 630c, each of which receives BSSID data from additional APs (not illustrated). Management device 620 may then provide a user display like that of FIGS. 1, 2A, 2B and 5 that provides normalized BSSID data from the APs associated with all of WLCs 630a-c, as well as WLC 615.

Figure 7:
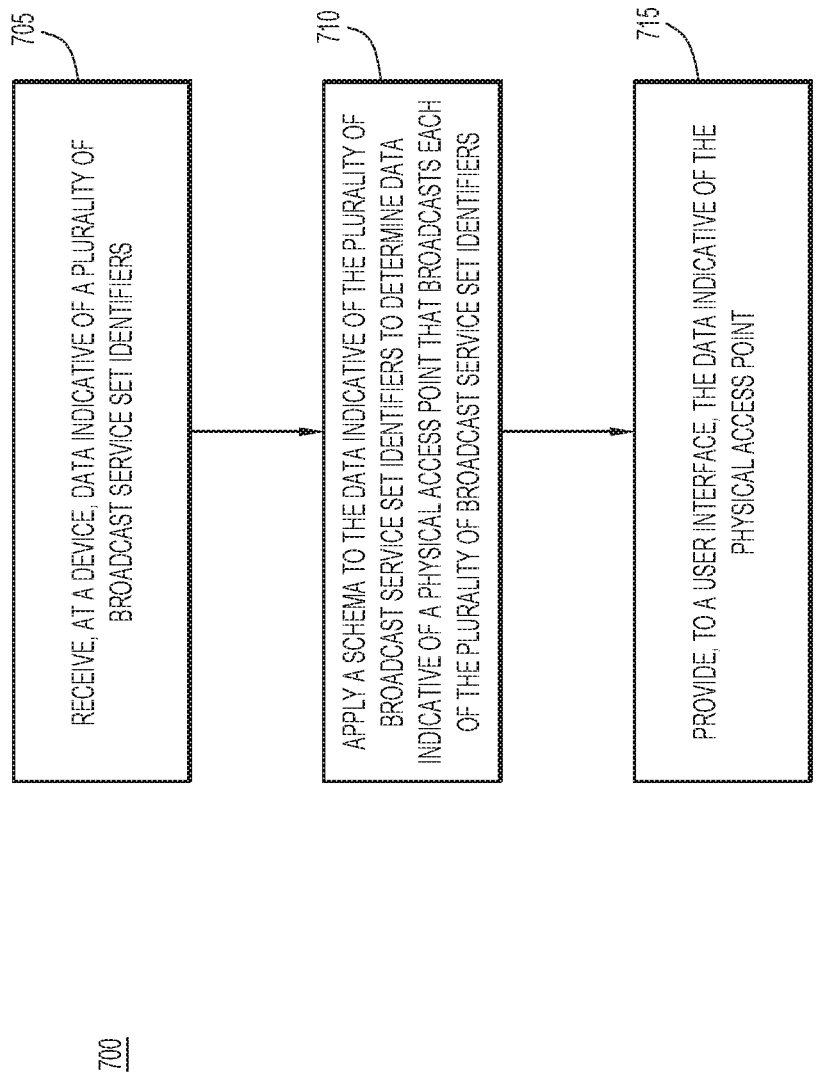
FIG. 7 is a flowchart illustrating a process for implementing the aggregation and correlation techniques of the present disclosure, according to an example embodiment.

With reference now made to FIG. 7, depicted therein a flowchart providing a process flow 700 to implement the techniques of the present disclosure. Process flow 700 begins in operation 705 in which a device receives data indicative of a plurality of BSSIDs. For example, the device of operation 705 may be a WLC, such as WLC 615 of FIG. 6, that is configured to receive the BSSIDs from the APs. According to other examples, the device of operation 705 may be a management device, such as management device 620 of FIG. 6, that receives BSSID data from a WLC.

In operation 710, a schema is applied to the data indicative of the plurality of BSSIDs to determine data indicative of a physical AP that broadcasts each of the plurality of BSSIDs. For example, operation 710 may determine a MAC address or another type of normalized BSSID. Operation 710 may take the form of the techniques described above with reference to FIGS. 3 and 4 in which a normalized BSSID or MAC address of a physical AP is determined from BSSIDs according to a manufacturer- or vendor-specific schema or algorithm. Operation 710 may be carried out by a WLC, such as WLC 615 of FIG. 6, or a management device, such as management device 620 of FIG. 6.

Finally, in operation 715, the data indicative of the physical access point is provided to a user interface. For example, the data indicative of the physical access point (e.g., a MAC address or normalized BSSID) may be provide to a device that implements a user interface like those described above with reference to FIGS. 1, 2A, 2B and 5. Operation 715 may be implemented by a WLC, such as WLC 615 of FIG. 6, or a management device, such as management device 620 of FIG. 6. Operation 715 may also include providing the data indicative of the plurality of BSSIDs to the user interface so that the user interface may implement functionality like that described above with reference to FIG. 5.

In summary, the techniques of the present disclosure, including the process flow 700 of FIG. 7, provide for a framework that utilizes different vendor specific algorithms that show relationships between different BSSIDs and the physical APs that broadcast the BSSIDs, to derive common/normalized BSSIDs (e.g., MAC addresses) from the list of reported BSSIDs. The use of such normalized BSSIDs may assist in the following:

Threat Display Reduction: Showing normalized BSSIDs for the physical APs in place of all BSSIDs being reported reduces the number of rogue APs displayed to the user.

Threat Accumulation: Different threat types (e.g., honeypot, interferer, rogue on wire, etc.) can be accumulated to a single AP and the APs may be sorted by threat level.

Threat Correlation: Identifying a single AP and its normalized BSSID (e.g., a physical MAC address) in combination with its associated BSSIDs may lead to faster correlation, which may be used for classification of threats, such as a "rogue on wire" threat.

The techniques of the present disclosure may be extended to include additional features. For example, once a physical AP is identified, the remaining BSSIDs that could come from the physical AP may be identified. In other words, the techniques of the present disclosure may be used to identify a physical AP connected to a network. Once the physical AP is identified, all possible BSSIDs that the physical AP may broadcast in the future may be determined. Through such techniques, a user may be provided with:

A list of BSSIDs that a physical AP can broadcast per band. In other words, a user may be provided with a list of all possible BSSIDs for a particular physical AP.

A list of Ethernet MAC addresses possible for the physical AP from BSSIDs (i.e., switch port tracing)

Figure 8:
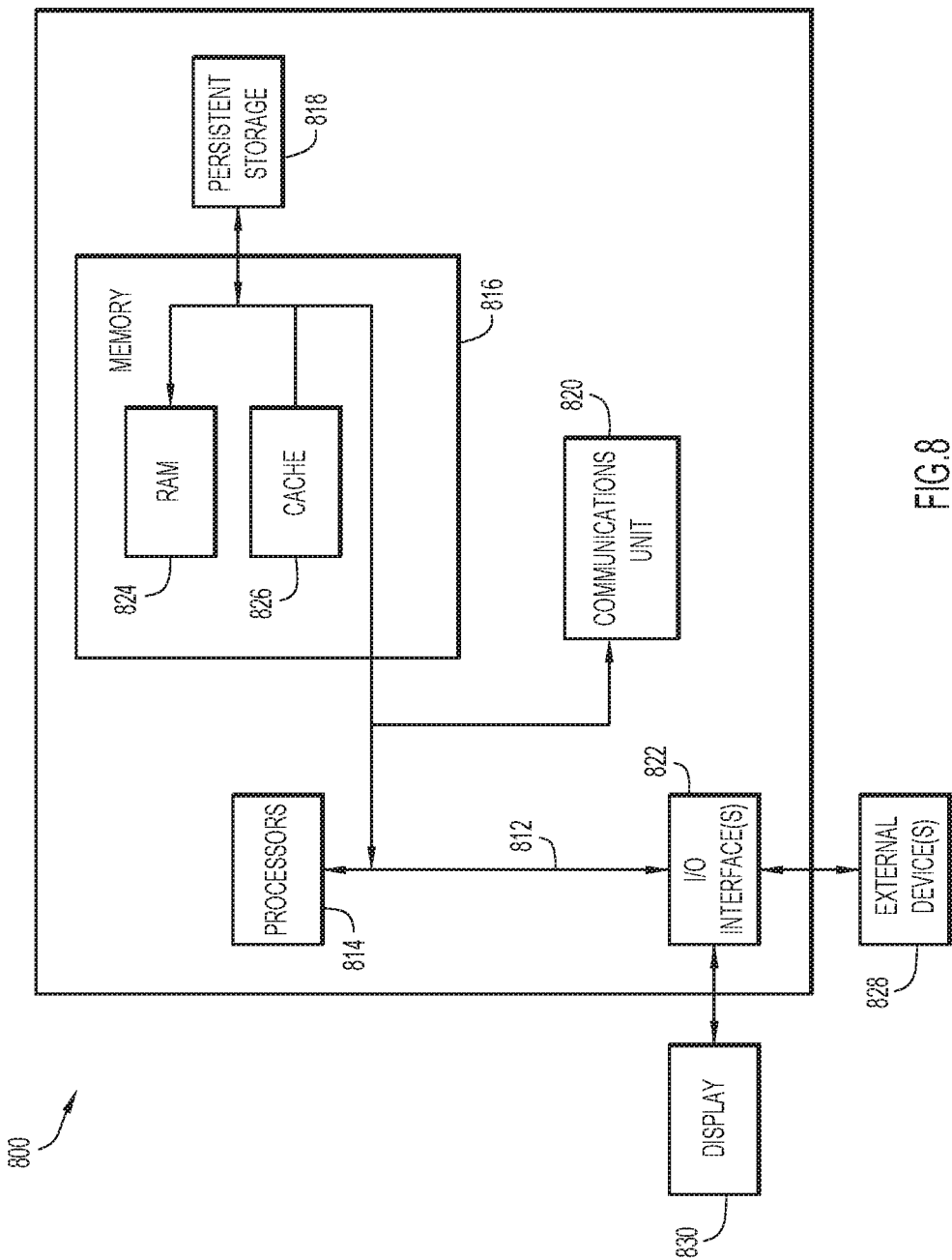
FIG. 8 is a functional block diagram of a device configured to implement the aggregation and correlation techniques of the present disclosure, according to an example embodiment.

With reference now made to FIG. 8, illustrated therein is a hardware block diagram of an example device 800 (e.g., a computing device (such as a server) that performs the operations of the devices disclosed herein. For example, device 800 may be embodied as a WLC, such as WLCs 615 or 630a-c of FIG. 6, a management device, such as management device 620 of FIG. 6, or a user device, such as user device 625 of FIG. 6. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and Input/Output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes Random Access Memory (RAM) 824 and cache memory 826. In general, memory 816 can include any suitable volatile or non-volatile computer readable storage media. Instructions to implement the techniques of the present disclosure may be stored in memory 816 or persistent storage 818 for execution by computer processor(s) 814.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to device 800. For example, I/O interface(s) 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for herein are methods, devices and apparatuses, and computer readable media that reduce and correlate the number of rogue events that are displayed to a user into a smaller subset that can uniquely identify the physical rogue AP in the network that is associated with a plurality BSSIDs.

According to example embodiments, provided for herein are methods that include receiving, at a device, data indicative of a plurality of broadcast service set identifiers; applying a schema to the data indicative of the plurality of broadcast service set identifiers to determine data indicative of a physical access point that broadcasts each of the plurality of broadcast service set identifiers; and providing, to a user interface, the data indicative of the physical access point.

Also provided for herein are apparatuses that include one or more network interfaces and one or more processors. The one or more processors are configured to receive, via the one or more network interfaces, data indicative of a plurality of broadcast service set identifiers; apply a schema to the data indicative of the plurality of broadcast service set identifiers to determine data indicative of a physical access point that broadcasts each of the plurality of broadcast service set identifiers; and provide, via the one or more network interfaces to a user interface, the data indicative of the physical access point.

In addition to the methods and apparatuses, non-transitory computer readable storage media encoded with instructions are also provided for. According to the present disclosure, one or more non-transitory computer readable storage media are encoded with instructions that, when executed by a processor, cause the processor to: receive, at a device, data indicative of a plurality of broadcast service set identifiers; apply a schema to the data indicative of the plurality of broadcast service set identifiers to determine data indicative of a physical access point that broadcasts each of the plurality of broadcast service set identifiers; and provide, to a user interface, the data indicative of the physical access point.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, at a device, data indicative of a plurality of different broadcast service set identifiers;
        applying a schema to the data indicative of the plurality of different broadcast service set identifiers to derive data indicative of a normalized broadcast service set identifier for a physical access point that broadcasts all of the plurality of different broadcast service set identifiers, wherein applying the schema to the data indicative of the plurality of different broadcast service set identifiers comprises determining a vendor associated with the physical access point that broadcasts all of the plurality of different broadcast service set identifiers, and determining the data indicative of the normalized broadcast service set identifier for the physical access point that broadcasts all of the plurality of different broadcast service set identifiers according to a known schema associated with the vendor for generating broadcast service set identifiers; and
    providing, to a user interface, the data indicative of the normalized broadcast service set identifier for the physical access point.

2. The method of claim 1, wherein the normalized broadcast service set identifier for the physical access point comprises a Media Access Control address of the physical access point.

3. The method of claim 1, wherein determining the vendor associated with the physical access point that broadcasts all of the plurality of different broadcast service set identifiers comprises determining the vendor from three octets of each of the plurality of different broadcast service set identifiers.

4. The method of claim 1, wherein determining the data indicative of the normalized broadcast service set identifier for the physical access point that broadcasts all of the plurality of different broadcast service set identifiers according to the known schema associated with the vendor for generating broadcast service set identifiers comprises changing a value in an octet of each of the plurality of different broadcast service set identifiers.

5. The method of claim 1, wherein obtaining the data indicative of the plurality of different broadcast service set identifiers comprises obtaining the data from a wireless local area network controller.

6. The method of claim 5, wherein obtaining the data indicative of the plurality of different broadcast service set identifiers comprises obtaining the data from a plurality of wireless local area network controllers.

7. An apparatus comprising:
    one or more network interfaces, and
    one or more processors, wherein the one or more processors are configured to:
        obtain, via the one or more network interfaces, data indicative of a plurality of different broadcast service set identifiers;
        apply a schema to the data indicative of the plurality of different broadcast service set identifiers to derive data indicative of a normalized broadcast service set identifier for a physical access point that broadcasts all of the plurality of different broadcast service set identifiers, wherein the one or more processors are configured to apply the schema by determining a vendor associated with the physical access point that broadcasts all of the plurality of different broadcast service set identifiers, and determining the data indicative of the normalized broadcast service set identifier for the physical access point that broadcasts all of the plurality of different broadcast service set identifiers according to a known schema associated with the vendor for generating broadcast service set identifiers; and provide, via the one or more network interfaces to a user interface, the data indicative of the normalized broadcast service set identifier for the physical access point.

8. The apparatus of claim 7, wherein the data indicative of the normalized broadcast service set identifier for the physical access point comprises a Media Access Control address of the physical access point.

9. The apparatus of claim 7, wherein the one or more processors are configured to determine the vendor associated with the physical access point that broadcasts all of the plurality of different broadcast service set identifiers by determining the vendor from three octets of each of the plurality of different broadcast service set identifiers.

10. The apparatus of claim 7, wherein the one or more processors are configured to derive the data indicative of the normalized broadcast service set identifier for the physical access point that broadcasts all of the plurality of different broadcast service set identifiers according to the known schema associated with the vendor for generating broadcast service set identifiers by changing a value in an octet of each of the plurality of different broadcast service set identifiers.

11. The apparatus of claim 7, wherein the one or more processors are configured to obtain the data indicative of the plurality of different broadcast service set identifiers by obtaining the data from a wireless local area network controller.

12. The apparatus of claim 7, wherein the one or more processors are configured to obtain the data indicative of the plurality of different broadcast service set identifiers by obtaining the data from a plurality of wireless local area network controllers.

13. One or more non-transitory computer readable storage media encoded with instructions that, when executed by a processor, cause the processor to:

obtain, at a device, data indicative of a plurality of different broadcast service set identifiers;

apply a schema to the data indicative of the plurality of different broadcast service set identifiers to derive data indicative of a normalized broadcast service set identifier for a physical access point that broadcasts all of the plurality of different broadcast service set identifiers, wherein the instructions cause the processor to apply the schema by determining a vendor associated with the physical access point that broadcasts all of the plurality of different broadcast service set identifiers, and determining the data indicative of the normalized broadcast service set identifier for the physical access point that broadcasts all of the plurality of different broadcast service set identifiers according to a known schema associated with the vendor for generating broadcast service set identifiers; and provide, to a user interface, the data indicative of the normalized broadcast service set identifier for the physical access point.

14. The one or more non-transitory computer readable storage media of claim 13, wherein the data indicative of the normalized broadcast service set identifier for the physical access point comprises a Media Access Control address of the physical access point.

15. The one or more non-transitory computer readable storage media of claim 13, wherein the instructions that cause the processor to determine the vendor associated with the physical access point that broadcasts all of the plurality of different broadcast service set identifiers further cause the processor to determine the vendor from three octets of each of the plurality of different broadcast service set identifiers.

16. The one or more non-transitory computer readable storage media of claim 13, wherein the instructions that cause the processor to derive the data indicative of the normalized broadcast service set identifier for the physical access point that broadcasts all of the plurality of different broadcast service set identifiers according to the known schema associated with the vendor for generating broadcast service set identifiers are further configured to change a value in an octet of each of the plurality of different broadcast service set identifiers.

17. The one or more non-transitory computer readable storage media of claim 13, wherein the instructions that cause the processor to obtain the data indicative of the plurality of different broadcast service set identifiers are further configured to obtain the data from a wireless local area network controller.

18. The one or more non-transitory computer readable storage media of claim 13, wherein the instructions that cause the processor to obtain the data indicative of the plurality of different broadcast service set identifiers are further configured to obtain the data from a plurality of wireless local area network controllers.

* * * * *